United States Patent
Horikawa et al.

(10) Patent No.: US 7,396,489 B2
(45) Date of Patent: Jul. 8, 2008

(54) PLASMA DISPLAY DEVICE AND METHOD OF MANUFACTURING SAME

(75) Inventors: Keiji Horikawa, Kyoto (JP); Yuichiro Miyamae, Osaka (JP); Masaki Aoki, Osaka (JP); Kazuhiko Sugimoto, Kyoto (JP); Junichi Hibino, Kyoto (JP); Yoshinori Tanaka, Osaka (JP); Hiroshi Setoguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/545,208

(22) PCT Filed: Dec. 13, 2004

(86) PCT No.: PCT/JP2004/018550

§ 371 (c)(1),
(2), (4) Date: Aug. 11, 2005

(87) PCT Pub. No.: WO2005/059944

PCT Pub. Date: Jun. 30, 2005

(65) Prior Publication Data

US 2006/0139241 A1    Jun. 29, 2006

(30) Foreign Application Priority Data

Dec. 16, 2003    (JP) .............................. 2003-417802
Dec. 22, 2003    (JP) .............................. 2003-424156

(51) Int. Cl.
  C09K 11/59    (2006.01)
  C09K 11/55    (2006.01)
  H01J 11/02    (2006.01)

(52) U.S. Cl. .............................. 252/301.4 F; 313/582; 313/584; 313/486

(58) Field of Classification Search ........... 252/301.4 F; 313/582, 584, 486
See application file for complete search history.

(56) References Cited

U.S. PATENT DOCUMENTS 3,468,810 A    9/1969    Mizuno (Continued)

FOREIGN PATENT DOCUMENTS

| EP | 1 193 306 | 4/2002 |
| EP | 1 353 354 | 10/2003 |
| JP | 2002-332481 | 11/2002 |

(Continued)

OTHER PUBLICATIONS

Phosphor Handbook, Ohm Co., Ltd., translation of [3](a)(1-4), pp. 219-220 (1987).

*Primary Examiner*—C. Melissa Koslow
(74) *Attorney, Agent, or Firm*—Steptoe & Johnson LLP

(57) ABSTRACT

A plasma display device including a green phosphor of which brightness is hardly deteriorated and a production method therefore are disclosed. The plasma display device comprises a plasma display panel in which a plurality of discharge cells of one color or a plurality of colors are disposed, red phosphor layers 110R, green phosphor layers 110G, and blue phosphor layers 110B are arranged correspondingly to the respective discharge cells, and the red phosphor layers 110R, the green phosphor layers 110G, and the blue phosphor layers 110B are excited by ultraviolet rays to emit light. The green phosphor layers 110G include a green phosphor expressed by $(M_{a-x-y}Eu_xTb_y)O \cdot MgO \cdot 2SiO_2$ (here, M is at least one element selected from Ca, Sr, and Ba).

9 Claims, 4 Drawing Sheets

U.S. PATENT DOCUMENTS

| | | | |
|---|---|---|---|
| 3,523,091 A | 8/1970 | McAllister | |
| 3,676,361 A | 7/1972 | Datta | |
| 4,088,599 A | 5/1978 | Suzuki et al. | |
| 6,802,990 B2 * | 10/2004 | Toda et al. | 252/301.4 F |
| 6,939,480 B2 * | 9/2005 | Aoki et al. | 252/301.4 F |
| 2002/0038861 A1 * | 4/2002 | Toda et al. | 252/301.4 F |
| 2003/0085853 A1 | 5/2003 | Shiiki et al. | 345/60 |

FOREIGN PATENT DOCUMENTS

| | | | |
|---|---|---|---|
| JP | 2003-206480 | | 7/2003 |
| JP | 2003-238954 | | 8/2003 |
| KR | 1993-0023907 | | 6/1995 |
| KR | 10-2002-0022027 | | 11/2003 |
| WO | WO 03/036675 | * | 5/2003 |

* cited by examiner

PLASMA DISPLAY DEVICE AND METHOD OF MANUFACTURING SAME

The present application is based on International Application PCT/JP2004/018550, filed Dec. 13, 2004, which application is incorporated herein by reference in its entirety.

TECHNICAL FIELD

The present invention relates to a plasma display device which can be used for image display of a television or the like and a method of manufacturing the same.

BACKGROUND ART

In recent years, in a color display device which is used for image display of a computer, a television, or the like, a plasma display device which uses a plasma display panel (hereinafter, refers to as a 'PDP' or a 'panel') has received attention as a color display panel which can realize a thin thickness and a lightness with a large size.

The plasma display device performs full color display by performing an additive color mixture of so-called three primary colors (red, green, blue). In order to perform such a full color display, the plasma display device includes phosphor layers which emit light components of the three primary colors, which are red (R), green (G), and blue (B). A phosphor particle constituting the phosphor layer is excited by ultraviolet rays generated inside discharge cells of the PDP to emit visible light of each color.

As chemical compounds used as color phosphors, for example, $(Y, Gd)BO_3$:Eu, $Y_2O_3$:Eu which emits a red light component, $Zn_2SiO_4$:Mn which emits a green light component, $BaMgAl_{10}O_{17}$:Eu which emits a blue light component are known. As a method of manufacturing each of the phosphors, an example in which predetermined raw materials are mixed with each other and then solid-phase reaction is performed by baking the mixture at a temperature of 1000° C. or more is disclosed at 'phosphor handbook' (pp. 219-220, published by Ohmsha, Ltd.). Further, the phosphor particle obtained by the baking process is apt to be sintered by the baking process. Therefore, the phosphor particle is used after being grinded and sorted (a mean particle size of red and green phosphor is 2 µm to 5 µm, a mean particle size of blue phosphor is 3 µm to 10 µm.

However, since a phosphor particle of the conventional $Zn_2SiO_4$:Mn which emits a green light component is manufactured through a grinding process after solid-phase reaction, stress is applied to a surface of the phosphor particle to occur strain, and various defects such as so-called oxygen defect are generated. Therefore, there is a problem in that such a defect absorbs water contained in the atmosphere during the process of manufacturing the panel, water reacts with the phosphor inside the panel during the time of raising the temperature when the panel is sealed up, such that the brightness of the phosphor deteriorates. Further, the defect absorbs ultraviolet rays of 147 nm which is generated due to the discharge, such that the excitation of the light-emitting center is interrupted. Furthermore, there is another problem in that water reacts with MgO serving as a protecting film inside the panel to cause an address discharge miss. Further, the phosphor of $Zn_2SiO_4$:Mn is easily suffered from ion impaction. As a result, there is still another problem in that the deterioration of the brightness is significant, such that sufficiently high brightness can not be obtained. Furthermore, since the $Zn_2SiO_4$:Mn is negatively-charged, the charging tendency thereof is different from that of the red phosphor or the blue phosphor. Therefore, there is problem in that the discharge error may be easily generated.

DISCLOSURE OF THE INVENTION

The plasma display device according to the present invention is a plasma display device in which a plurality of discharge cells of one color or a multiple colors are disposed, a plurality of phosphor layers corresponding to colors of the respective discharge cells are disposed, and the phosphor layers are excited by ultraviolet rays to emit light. The phosphor layers include green phosphor layers, and the green phosphor layers include a green phosphor expressed by $(M_{a-x-y}Eu_xTh_y)O_a \cdot MgO \cdot 2SiO_2$ (here, M is at least one element selected from Ca, Sr, and Ba).

According to the present invention, it is possible to provide a plasma display device including a green phosphor in which the deterioration of the brightness is hardly generated during the time of manufacturing the panel and to improve the brightness, the durability, the reliability of the plasma display device.

REFERENCE NUMERALS

BEST MODE FOR CARRYING OUT THE INVENTION

Figure 1:
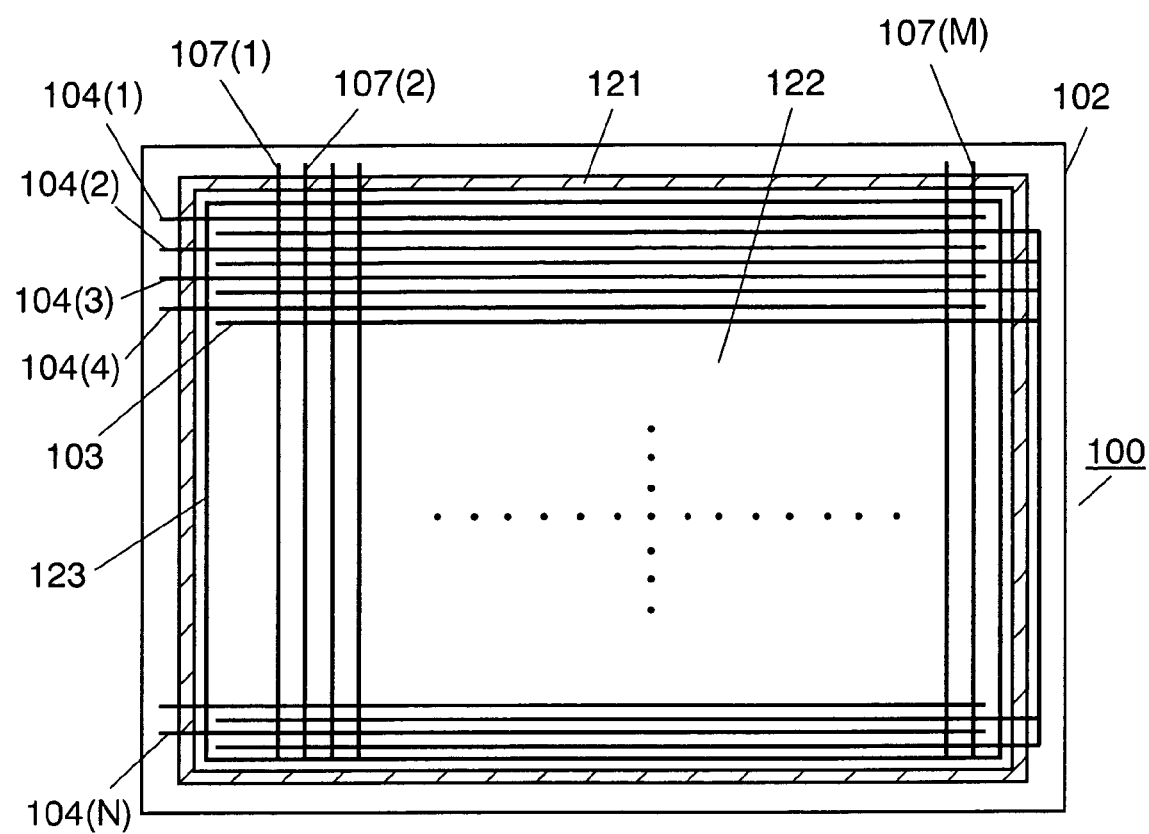
FIG. 1 is a plan view of a PDP used in a plasma display device according to an embodiment of the present invention, in which a front glass substrate is not shown.

In the present invention, the phosphor expressed by $(M_{a-x-y}Eu_xTb_y)O_a \cdot MgO \cdot 2SiO_2$ (here, M is at least one element selected from Ca, Sr, and Ba) is manufactured by any one of an aqueous solution synthesis method, a spray synthesis method, a hydrothermal synthesis method, and a hydrolysis synthesis method which can easily obtain a particle having a substantially spherical shape. Specifically, a precursor of the phosphor is manufactured from a raw material of the phosphor. Since the precursor of the phosphor has a substantially spherical shape, even though the precursor is thermally-treated at a high temperature of 1000° C. to 1400° C., each particle hardly bonds to each other, such that the phosphor in which its substantially spherical shape is maintained is obtained. Further, the term 'substantially spherical shape' means that an axis diameter ratio (short axis diameter/long axis diameter) of almost phosphor particles is maintained, for example, within a range of 0.9 to 1.0 and it is not necessary that whole phosphor particles are maintained within the range.

Therefore, the phosphor is grinded only a little, such that the phosphor whose brightness is high and whose amount of defect is small can be obtained. Further, since ZnO is not contained in the composition of the phosphor like the conventional $Zn_2SiO_4$:Mn, even though the phosphor is baked at a high temperature of 1000° C. to 1400° C., a specific raw material does not selectively sublimate, and the deviation in composition of the phospher does not occur. Therefore, it is possible to obtain the green phosphor with the excellent durability characteristic.

Further, since the phosphor formed by the manufacturing method according to the present invention is small in diameter, is uniform in particle size distribution, and is excellent in crystalline property, the filling density of the phosphor particle is improved when the phosphor layer is formed. Therefore, a light-emitting area of the phosphor particle which substantially takes part in light emission is increased, and the phosphor does not readily deteriorate due to the discharge. Thus, even though the discharge space is small in, for example, a PDP which displays a high definition image, it is possible to obtain a high brightness.

Hereinafter, four kinds of methods as a specific method of manufacturing the phosphor will be described by taking a green phosphor as an example.

First, the aqueous solution synthesis method will be described. As raw materials of a phosphor, barium nitrate $Ba(NO_3)_2$, calcium nitrate $Ca(NO_3)_2$, strontium nitrate $Sr(NO_3)_2$, magnesium nitrate $Mg(NO_3)_2$, silicon oxide $SiO_2$ (colloidal silica), ethyl silicate $Si(O.C_2H_5)_4$, europium nitrate $Eu(NO_3)_3$, and terbium nitrate $Tb(NO_3)_3$ are used. This raw material of the phosphor is dissolved in an aqueous medium to thus prepare an aqueous mixture (a step of preparing a mixture). Then, the mixture is bubbled by using oxygen ($O_2$), ozone ($O_3$), or oxygen-nitrogen ($O_2$—$N_2$) while applying ultrasonic waves thereto, and an alkaline aqueous solution is added to and mixed with the mixture to thus prepare a hydrate which is a precursor of phosphor (a step of preparing a hydrate). And then, a solution containing the precursor of the phosphor obtained from the step of preparing the hydrate is heat-treated in the air at a temperature of 700° C. to 900° C. to thus obtain a precursor powder of the phosphor (a step of a heat treatment). And then, the precursor powder of the phosphor is baked at a temperature of 1000° C. to 1400° C. under a reducing atmosphere (a step of baking) to thus manufacture a green phosphor which is substantially spherical shaped powder.

Next, the spray synthesis method will be described. The step of preparing the mixture and the step of preparing the hydrate, which are described in the aqueous solution synthesis method, are performed. Then, liquid droplets of the alkaline aqueous solution containing the precursor of the phosphor obtained from the step of preparing the hydrate are sprayed into a furnace heated at a temperature of 1000° C. to 1500° C. (a step of spraying) to thus prepare a precursor powder of the phosphor. And then, the precursor powder of the phosphor is baked at a temperature of 1000° C. to 1400° C. under a reducing atmosphere to thus manufacture a green phosphor which is substantially spherical shaped powder.

Next, the hydrothermal synthesis method will be described. The step of preparing the mixture and the step of forming the hydrate, which are described in the aqueous solution synthesis method, are performed. Then, the alkaline aqueous solution containing the precursor of the phosphor obtained from the step of forming the hydrate is put into a highly pressured container and is applied with a pressure of 0.2 MPa to 10 MPa at a temperature of 100° C. to 300° C. to perform a hydrothermal synthesis reaction (a step of a hydrothermal synthesis), thereby obtaining a precursor powder of the phosphor. And then, the precursor powder of the phosphor is baked at a temperature of 1000° C. to 1400° C. under a reducing atmosphere to thus manufacture a green phosphor which is substantially spherical shaped powder.

Next, the hydrolysis synthesis method will be described. An organic compound containing each of Ca, Sr, Ba, Mg, Si, Eu, and Tb (metal acetyl acetone and metal alkoxide) is used as a raw material of the phosphor. The raw material of the phosphor, alcohol, and water are mixed and the resultant mixture is hydrolysis-reacted to thus manufacture a precursor of the phosphor. Then, the precursor of the phosphor is heat-treated at a temperature of 700° C. to 900° C. to thus obtain a precursor powder of the phosphor. And then, the precursor powder of the phosphor is baked at a temperature of 1000° C. to 1400° C. under a reducing atmosphere to thus manufacture a green phosphor which is substantially spherical shaped powder.

In the aqueous solution synthesis method, the spray synthesis method, the hydrothermal synthesis method, and the hydrolysis synthesis method described above, the precursor of the phosphor has a substantially spherical shape. Therefore, the green phosphor particle obtained from the precursor has also the substantially spherical shape, and has a small particle size of 0.05 μm to 3 μm, and is excellent in a particle size distribution. As a result, the filling density of the phosphor particle is improved when the phosphor layer is formed. Therefore, a light-emitting area of the phosphor particle which substantially takes part in light emission is increased. Thus, even though the discharge space volume of a PDP is one third of that of the conventional PDP and the film thickness of the phosphor is one third of that of the conventional PDP, the brightness of the plasma display device is improved and the deterioration of the brightness is suppressed, such that it is possible to obtain a plasma display device excellent in the brightness characteristics.

Specifically, instead of the green phosphor of $Zn_2SiO_4$:Mn in which the deterioration of the brightness is large, a green phosphor expressed by following chemical formula, $(M_{a-x-y}Eu_xTb_y)O.MgO.2SiO_2$ (here, M is at least one element selected from Ca, Sr, and Ba) is used, such that various deterioration can be largely improved.

Here, it is preferable that the mean particle size of the green phosphor is 0.1 μm to 3 μm. Further, it is preferable that in the particle distribution, the maximum particle size is 8 μm or less, and the minimum particle size is one fourth or more of the mean particle size. In the phosphor particle, a region to which ultraviolet rays reach is thin, for example, several hundreds nm from the particle surface, such that substantially only the particle surface emits a light. Therefore, when the mean particle size of the phosphor is 3 μm or less, the surface area of particle which participates in the light emission increases and the light emission efficiency is maintained at a high state. Further, when the mean particle size of the phosphor exceeds 3 μm, the thickness of the phosphor layer needs to be 20 μm or more, so that the discharge space is not sufficiently secured. On the other hand, when the mean particle size of the phosphor is less than 0.1 μm, the defect is easily generated and the brightness is not improved.

Hereinafter, a plasma display device according to an embodiment of the present invention will be described with reference to the attached drawings.

Figure 2:
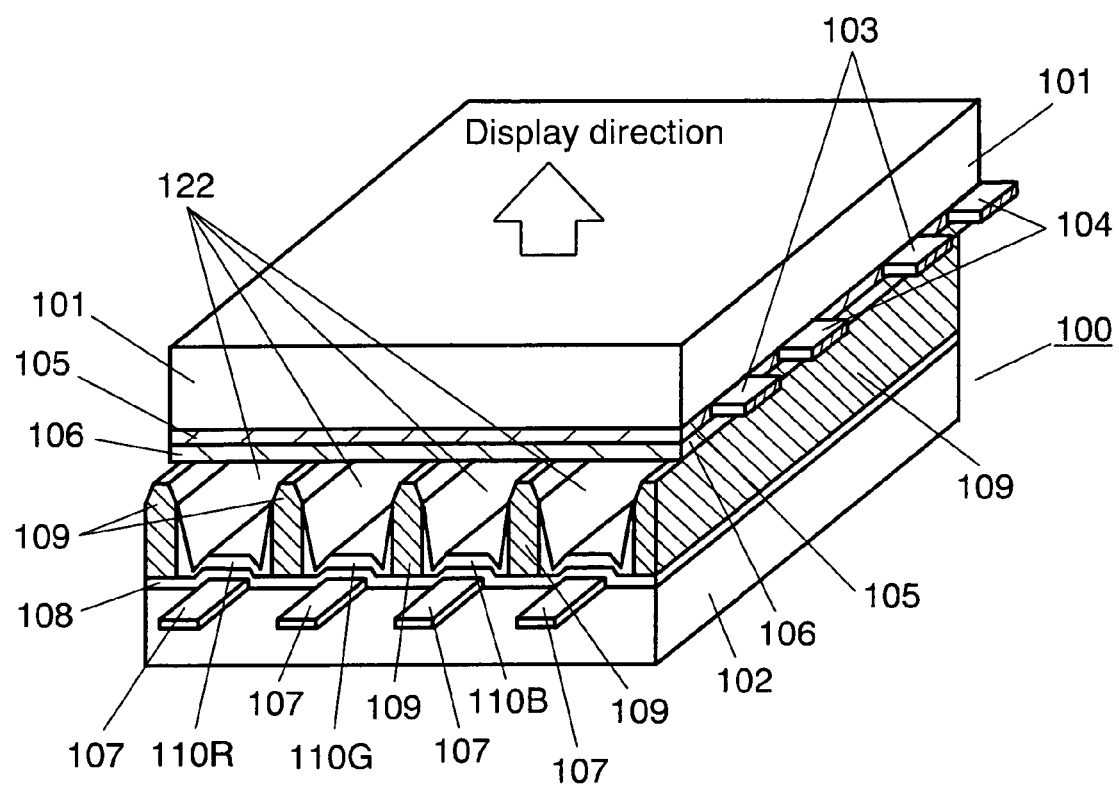
FIG. 2 is a perspective view showing a structure of an image display region of the PDP used in the plasma display device according to the embodiment of the present invention.

FIG. 1 is a plan view of PDP 100, in which front glass substrate 101 is removed. FIG. 2 is a perspective view showing a part of image display region 123 of PDP 100 shown in FIG. 1. Further, in FIG. 1, the number of display electrodes 103, display scan electrodes 104, address electrodes 107, or the like is partially omitted for the purpose of easy understanding. The structure of PDP 100 is described with reference to FIGS. 1 and 2.

As shown in FIG. 1, PDP 100 includes front glass substrate 101 (not shown), rear glass substrate 102, N display electrodes 103, N display scan electrodes 104 (in the case of indicating n-th electrode, the number n is written inside parentheses), M address electrodes 107 (in the case of indicating m-th electrode, the number m is written inside parentheses), air-tight sealing layer 121 shown by oblique lines, or the like. Electrode matrix of three-electrode structure by electrodes 103, 104, and 107 is formed and discharge cells are formed at intersections of display electrodes 103 and display scan electrode 104, and address electrodes 107.

As shown in FIG. 2, PDP 100 is formed by laminating a front panel in which display electrodes 103, display scan electrodes 104, dielectric glass layer 105 and protective layer 106 are disposed at one main surface of front glass substrate 101, and a rear panel in which address electrodes 107, dielectric glass layer 108, barrier ribs 109, red phosphor layers 110R, green phosphor layers 110G and blue phosphor layers 110B are disposed at one main surface of rear glass substrate 102. Discharge gas composed of for example, neon (Ne), xenon (Xe), or the like is filled into the inside of discharge spaces 122 formed between the front panel and the rear panel.

Figure 3:
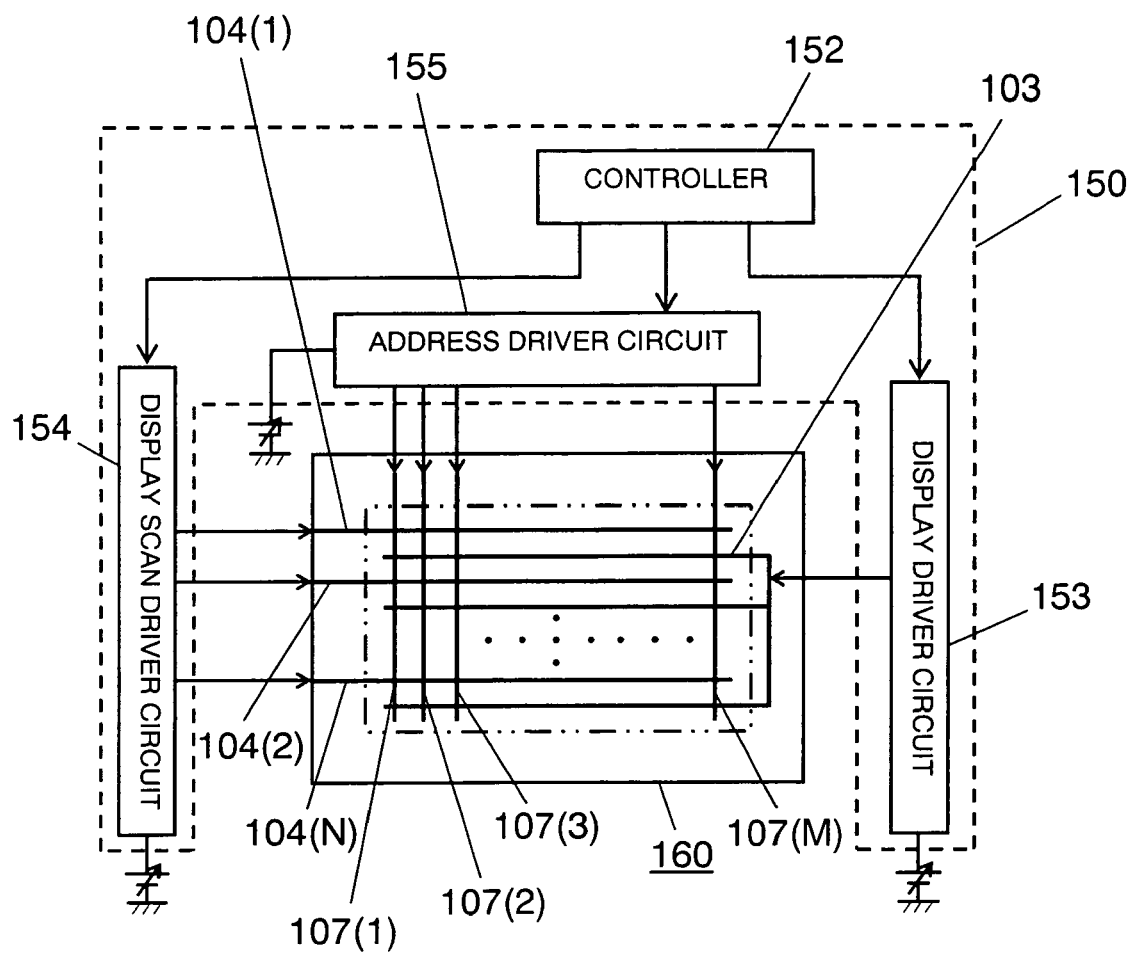
FIG. 3 is a block diagram of the plasma display device according to the embodiment of the present invention.

FIG. 3 is a block diagram of the plasma display device according to the embodiment of the present invention. Plasma display device 160 shown in FIG. 3 is constructed by connecting PDP driving device 150 to PDP 100. PDP driving device 150 is constructed by display driver circuit 153 for driving display electrodes 103, display scan driver circuit 154 for driving display scan electrodes 104, address driver circuit 155 for driving address electrodes 107, and controller 152 for controlling above-described circuits. At the time of driving plasma display device 160, according to the control of controller 152, a pulse voltage is applied to display scan electrodes 104 and address electrodes 107 of the discharge cells to be turned on, and an address discharge is performed therebetween. Then, the pulse voltage is applied between display electrodes 103 and display scan electrodes 104, and a sustain discharge is performed. Ultraviolet rays are generated at the discharge cells by the sustain discharge, and the phosphor layer, which is excited by the ultraviolet rays, emits light, such that the discharge cells are turned on. By doing so, images are displayed by association of turn on and off of the discharge cells in which phosphor layers of each color are formed.

Hereinafter, a method of manufacturing PDP 100 described above will be described with reference to FIGS. 1 and 2.

The front panel is manufactured such that on front glass substrate 101, N display electrodes 103 and display scan electrodes 104 (in FIG. 2, only two display electrodes and two display scan electrodes are shown) are alternately formed in strips and in parallel to each other, dielectric glass layer 105 is formed so as to cover display electrodes 103 and display scan electrodes 104, and then protective layer 106 is formed on the surface of dielectric glass layer 105.

Display electrodes 103 and display scan electrodes 104 are electrodes comprised of a transparent electrode made of ITO (indium tin oxide) and a bus electrode made of a metal material such as silver. For example, an ITO film is formed at almost entire surface on front glass substrate 101 by a sputter method, transparent electrodes having a predetermined pattern (in strips) are formed by patterning the ITO film by etching method, silver paste for bus electrode is applied to the transparent electrodes by a screen printing, and the silver pastes are baked to thus form the display electrodes 103 and display scan electrodes 104.

Dielectric glass layer 105 having a predetermined layer-thickness (about 20 μm) is formed by applying a paste including lead-based glass material by a screen printing method, and by baking at a predetermined temperature and for a predetermined time (for example, at 560° C., for twenty minutes). For example, a mixture of an organic binder, and PbO (70 wt %), $B_2O_3$ (15 wt %), $SiO_2$ (10 wt %) and $Al_2O_3$ (5 wt %) is used as the paste including the lead-based glass material. Here, the organic binder is formed by dissolving a resin in an organic solvent. For example, the organic binder is formed by dissolving 10% ethyl cellulose in α-terpineol. In addition to the ethyl cellulose, it is possible to use an acryl resin as the resin and butylcarbitol as the organic solvent. Further, for example, glyceryltrioleate or the like may be added to the organic binder as a dispersant.

Protective film 106 is composed of magnesium oxide (MgO) and is formed to have a predetermined thickness (about 0.5 μm), for example, by a sputtering method, a CVD method (chemical vapor deposition method).

The rear panel is formed by following process. First, a silver paste for electrode is screen-printed on rear glass substrate 102 and baked to thus form M address electrodes 107. A paste containing lead-based glass material is applied to cover address electrodes 107 using a screen printing method to thus form dielectric glass layer 108. The same paste containing lead-based glass material is repeatedly applied with a predetermined pitch by the screen printing method and is baked to thus form barrier ribs 109. Due to barrier ribs 109, discharge space 122 are divided into each discharge cell (unit light-emission region) in a direction parallel to discharge electrodes 103 and display scan electrodes 104.

Figure 4:
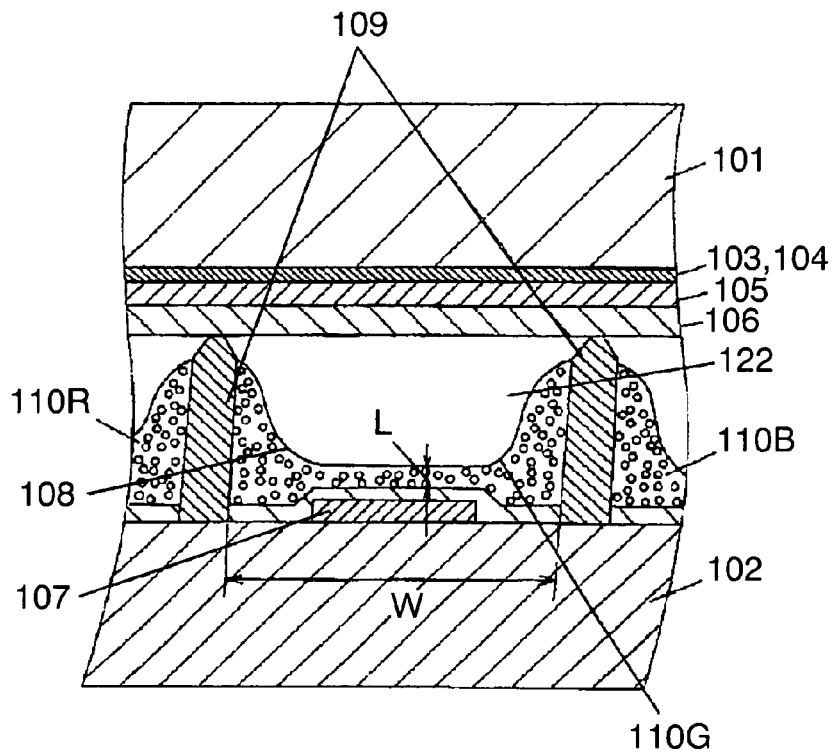
FIG. 4 is a sectional view showing a structure of the image display region of the PDP used in the plasma display device according to the embodiment of the present invention.

FIG. 4 is a partial sectional view of PDP 100. As shown in FIG. 4, gap width (W) between barrier ribs 109 is defined by about 130 μm to 240 μm in accordance with HD-TV of 32 inches to 50 inches. Then, a paste-shaped phosphor ink composed of a phosphor particle of red (R), green (G), and blue (B), and an organic binder is applied between barrier ribs 109. And then, rear glass substrate to which the paste-shaped phosphor ink is applied is burned at a temperature of 400° C. to 590° C. to burn away the organic binder, thereby forming red phosphor layers 110R, green phosphor layers 110G, and blue phosphor layers 110B, which are composed of each phosphor particle.

It is preferable that the thickness (L) in a laminating direction of red phosphor layers 110R, green phosphor layers 110G, and blue phosphor layers 110B on address electrodes 107 is 8 times to 25 times of the mean particle size of each color phosphor particle. Specifically, to secure the brightness (light emission efficiency) when regular ultraviolet rays are irradiated to the phosphor layer, it is preferable that the thickness of the phosphor is determined to secure a predetermined thickness in which the phosphor particles are laminated as at least 8 layers, and preferably 20 layers, so that ultraviolet rays generated in the discharge spaces is not transmitted therethrough. On the other hand, when the phosphor particles are made to have a thickness in which the phosphor particles are laminated as 25 layers or more, the light emission efficiency of the phosphor layer is saturated and the size of discharge space 122 can not be sufficiently secured.

Further, if the phosphor particle is sufficiently small in the particle size and has a substantially spherical shape, like that manufactured by the precursor of the phospher by use of the aqueous solution synthesis method, the hydrothermal synthesis method, the spray synthesis method, and the hydrolysis synthesis method, even though the number of laminating stage is equal, the filling density of the phosphor particle is increased as compared with particles not in a substantially spherical shape. As a result, since the total surface area of the phosphor particle increases, the surface area of the phosphor particle participating in actual light emission in the phosphor layer increases, whereby the light emission efficiency increases.

The front panel and rear panels manufactured by the above process are bonded together in a process of sealing the panels such that display electrodes 103 and display scan electrodes 104 of the front panel and address electrodes 107 of the rear panel are perpendicular to each other. At this time, a sealing glass is interposed between the peripheries of the panels and baked at a temperature about 450° C. for 10 minutes to 20 minutes to form air-tight seal layer 121 (FIG. 1), thereby sealing the panels. Then, first, air inside of discharge spaces 122 are exhausted at a highly vacuumed chamber (for example, $1.1 \times 10^{-4}$ Pa), discharge gas (for example, Ne—Xe based, He—Xe based inert gas) is filled thereto to thus manufacture PDP 100.

Figure 5:
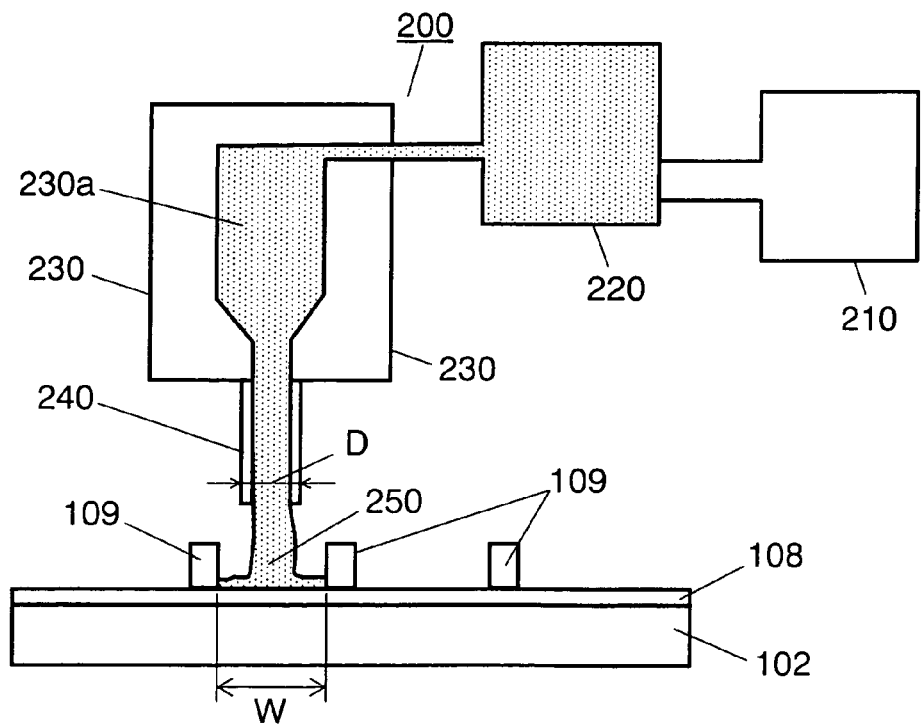
FIG. 5 is a schematic configuration view showing an ink applying device which is used for forming phosphor layers of PDP used in the plasma display device according to the embodiment of the present invention.

FIG. 5 is a schematic configuration view of an ink applying device which is used when red phosphor layers 110R, green phosphor layers 110G, and blue phosphor layers 110B are formed.

As shown in FIG. 5, ink applying device 200 includes server 210, pressing pump 220, and header 230. The phosphor ink supplied from server 210 containing phosphor ink is pressured by pressuring pump 220 and supplied to header 230. Header 230 includes ink chamber 230a and nozzle 240. The phosphor ink which is supplied to pressured ink chamber 230a is continuously ejected through nozzle 240. It is preferable that a diameter D of nozzle 240 is 30 μm or more for preventing the nozzle from being plugged and is less than the distance W (about 130 μm to 240 μm) between barrier ribs 109 for preventing the ink from running over the barrier ribs during the time of applying ink. Generally, the diameter D is set within a range of 30 μm to 130 μm.

Header 230 is constructed such that it is linearly driven by a scanning mechanism (not shown). The phosphor ink 250 is continuously ejected from nozzle 240 while header 230 is scanned, such that the ink is uniformly applied to grooves between barrier ribs 109 on rear glass substrates 102. Here, the viscosity of the used phosphor ink is maintained in a range of 1500 CP to 30000 CP (centipoise) at a temperature of 25° C.

Further, server 210 includes an agitating device (not shown), and a precipitation of the phosphor particle in the phosphor ink is prevented due to the agitating operation thereof. Furthermore, header 230 is integrated with ink chamber 230a and a part of nozzle 240, and is manufactured by a mechanical process of metal materials and a discharge process.

Further, as a method of forming the phosphor layer, it is not limited to the above-described method, various methods such as photolithography method, a screen printing method, and a method of disposing a film which is mixed with the phosphor particle can be used.

The phosphor ink is manufactured by mixing a phosphor particle of each color, a binder, and a solvent to have a viscosity of 1,500 CP to 30,000 CP. Further, as desired, a surfactant, silica, a dispersant (0.1 wt % to 5 wt %) may be added to the resultant mixture.

As a red phosphor mixed to the phosphor ink, compound expressed by $(Y, Gd)_{1-x}BO_3:Eu_x$ or $(Y_{1-x})_2O_3:Eu_x$ is used.

As a blue phosphor, a compound expressed by $Ba_{1-x}MgAl_{10}O_{17}:Eu_x$ or $Ba_{1-x-y}Sr_yMgAl_{10}O_{17}:Eu_x$ is used.

As a green phosphor, a compound expressed by $(M_{a-x-y}Eu_xTb_y)O_a \cdot MgO \cdot 2SiO_2$ (here, M is at least one element selected from Ca, Sr, and Ba) is used, and a part of element M (Ca, Sr, Ba) constituting a parent material is substituted with Eu, Tb to obtain a green light emission.

As a binder mixed to a phosphor ink, ethyl cellulose or acryl resin (mixed as a ratio of 0.1 wt % to 10 wt % of the phosphor ink) is used, and α-terpineol or butyl carbitol is used as a solvent. Further, a polymer such as PMA (methyl polyacrylate), PVA (polyvinyl alcohol) maybe used as the binder, and an organic solvent such as diethylene glycol and methyl ether may be used as the solvent.

The phosphor which is manufactured by the aqueous solution synthesis method, the hydrothermal synthesis method, the spray synthesis method, or hydrolysis synthesis method is used as a phosphor in the present embodiment. Specific method of manufacturing the phosphor of each color will be described.

First, a green phosphor will be described. In the case where the M is Ca, the synthesis of $(Ca_{a-x-y}Eu_xTb_y)O_a \cdot MgO \cdot 2SiO_2$ will be firstly described.

In the phosphor, when the above-described phosphor composition is expressed by a chemical formula, it becomes $aCaO \cdot xEuO \cdot yTbO \cdot MgO \cdot 2SiO_2$. Here, it will be described with respect to a case in which a=2.

First, in a step of preparing a mixture, each material of calcium nitrate $Ca(NO_3)_2$, magnesium nitrate $Mg(NO_3)_2$, silicon oxide $SiO_2$ (colloidal silica), europium nitrate $Eu(NO_3)_3$, and terbium nitrate $Tb(NO_2)_3$, which are raw materials of the phosphor, are mixed such that a molar ratio in the chemical formula becomes a:1:2:x:y (a=2, $0.02 \leq x \leq 0.2$, $0 \leq y \leq 0.05$), and the resultant mixture is dissolved in an aqueous medium to prepare the mixture (hydrated mixture). As the aqueous medium, ion-changed water or pure water is preferable from a point of view of no including impurity. However, even though non-aqueous medium (methanol, ethanol, or the like) is contained thereto, it can be used.

Next, an alkaline solution (for example, potassium hydroxide) is added to the hydrated mixture to thus prepare a sphere-shaped hydrate (a precursor of the phosphor). The sphere-shaped hydrate is input to a container made of gold or platinum which has corrosion-resistance and heat-resistance and a hydrothermal synthesis reaction is performed using an device such as an autoclave which is capable of heating while pressuring. The hydrothermal synthesis reaction is performed in the highly pressured container under a condition of a predetermined temperature (for example, 100° C. to 300° C.) and a predetermined pressure (for example, 0.2 MPa to 10 MPa), for 12 hours to 20 hours after alumina or graphite powder is input to the container as a reducing agent, thereby manufacturing a substantially spherical precursor powder of the phosphor.

Further, the substantially spherical precursor powder of the phosphor may be manufactured by the spray synthesis method of spraying the hydrated mixture into a furnace heated to a temperature of 1,000° C. to 1,500° C. directly from the pressured nozzle while applying ultrasonic waves, instead of using the autoclave.

Next, the precursor powder of the phosphor is baked at a reducing atmosphere (for example, atmosphere containing hydrogen 5% and nitrogen 95%) under a condition of a predetermined temperature and apredetermined time (for example, at a temperature of 800° C. to 1,400° C., for 2 hours). Then, the powder is sorted to thus obtain a desired green phosphor $(Ca_{2-x-y}Eu_xTb_y)O_2 \cdot MgO \cdot 2SiO_2$ $(Ca_2MgSi_2O_6:Eu, Tb)$.

Here, the method of obtaining the green phosphor expressed by $(Ca_{2-x-y}Eu_xTb_y)O_2 \cdot MgO \cdot 2SiO_2$ in the case in which M=Ca, a=2 was described. However, to obtain the green phosphor expressed by $(Ca_{1-x-y}Eu_xTb_y)O \cdot MgO \cdot 2SiO_2$ in the case in which M=Ca, a=1, the ranges of x and y are defined as $0 \leq x \leq 0.1$, $0.01 \leq y \leq 2$. Further, to obtain the green phosphor expressed by $(Ca_{3-x-y}Eu_xTb_y)O_3 \cdot MgO \cdot 2SiO_2$ in the case in which M=Ca, a=3, the ranges of x and y are defined as $0 \leq x \leq 0.1$, $0.01 \leq y \leq 2$. As described above, it is possible to obtain the green phosphor in which a composition ratio of Ca is different by changing the mixing ratio of the raw materials of the phosphor and using the same method.

Further, in the case in which M=Sr, strontium nitrate Sr $(NO_3)_2$ may be used instead of the $Ca(NO_3)_2$ as the raw material of the phosphor, and in the case in which M=Ba, barium nitrate $Ba(NO_3)_2$ may be used instead of the $Ca(NO_3)_2$ as the raw material of the phosphor In any case, the phosphor particle obtained by the hydrothermal synthesis method or the spray synthesis method has a substantially spherical shape, and the particle size thereof is smaller than that of particle obtained by the conventional solid-phase reaction.

Next, the synthesis method of $([Ca, Sr, Ba]_{a-x-y}Eu_xTb_y)O_a \cdot MgO \cdot 2SiO_2$ in the case in which M is a mixture of Ca, Sr, and Ba, will be described.

In the above described phosphor, when a composition thereof is expressed by a chemical formula, it becomes $a(Ca, Sr, Ba)O \cdot xEuO \cdot yTbO \cdot MgO \cdot 2SiO_2$. Here, (Ca, Sr, Ba)O is formed only by substituting a part of Ca with Sr or Ba (a ratio of Ca/(Sr, Ba) is 0.1 to 1). Hereinafter, it will be described with respect to the hydrolysis synthesis method in the case in which a=2.

As raw materials of the phosphor, calcium alkoxide $Ca(O.R)_2$, strontium alkoxide $Sr(O.R)_2$, barium alkoxide $Ba(O.R)_2$ (a ratio of Ca/(Sr, Ba) is 0.1 to 1.0), magnesium alkoxide $Mg(O.R)_2$, silicon alkoxide $Si(O.R)_4$, europium alkoxide $Eu(O.R)_3$, and terbium alkoxide $Tb(O.R)_3$ (here, R is an alkyl group) are used. The raw materials are mixed such that a molar ratio in the chemical formula becomes a:1:2:x:y (a=2, $0.02 \leq x \leq 0.2$, $0 \leq y \leq 0.05$). Here, the molar ratio a represents a total amount of $Ca(O.R)_2$, $Sr(O.R)_2$, and $Ba(O.R)_2$. Molar ratio after this corresponds to the describing order of the phospher materials, a molar ratio of $Mg(O.R)_2$ is 1, a molar ratio of $Si(O.R)_4$ is 2, a molar ratio of $Eu(O.R)_3$ is x, and a molar ratio of $Tb(O.R)_3$ is y. Then, water or alcohol is added to hydrolyze the resultant mixture of the raw materials of the phosphor, which has an alkyl group. The hydrolyzed precursor having a substantially spherical shape is baked at a temperature of 900° C. to 1300° C. Then, it is baked under a reducing atmosphere, for example, an atmosphere of hydrogen 5% and nitrogen 95%, and at a condition of predetermind temperature and predetermined time (for example, two hours at a temperature of 1000° C. to 1400° C.), and is sorted using an air sorter to thus obtain a green phosphor by the hydrolysis synthesis method.

Further, the values of 'a' of Ca, Sr, and Ba can be arbitrary selected as 1, 2, or 3, and a particular change is not seen at a parent crystal structure in each case. However, the temperature characteristic of the phosphor, specifically, the characteristic deterioration of the phosphor with respect to the temperature history during the time of manufacturing PDP becomes small as 'a' is large. Further, the baking temperature in the various synthesis methods described above need to be high when the value of 'a' is large. Therefore, the value of 'a' can be arbitrary selected depending on the process condition of manufacturing the phosphor and the process condition of manufacturing the PDP.

Further, Ca, Sr, and Ba may be used individually or may be used as a mixture thereof. In the case in which they are used individually, the characteristic deterioration of the phosphor with respect to the temperature history is in the order of Ba<Sr<Ca. Therefore, these materials may be arbitrary selected depending on the process condition of manufacturing the PDP.

Next, a blue phosphor will be described. A synthesis method of $Ba_{1-x}MgAl_{10}O_{17}:Eu_x$ or $Ba_{1-x-y}Sr_yMgAl_{10}O_{17}:Eu_x$ as the blue phosphor will be described.

The specific method of manufacturing the blue phosphor is as follows. For example, $Ba(NO_3)_2$, $Sr(NO_3)_2$, $Mg(NO_3)_2$, $Al(NO_3)_3$, and $Eu(NO_3)_3$ are used as raw materials of the phosphor. A spherical precursor of the phosphor is manufactured from the aqueous solution of the raw materials of the phosphor similarly to the synthesis of the green phosphor. Then, in the hydrothermal synthesis process using the precursor, the hydrothermal synthesis reaction is performed at a state in which a temperature is 100° C. to 300° C., and a pressure of 0.2 MPa to 10 MPa is applied. The powder obtained from the reaction is heat-treated in $H_2$—$N_2$, and sorted to thus obtain the blue phosphor.

Hereinafter, it will be described with respect to a red phosphor. A synthesis method of $(Y, Gd)_{1-x}BO_3:Eu_x$ as the red phosphor will be described.

In a step of preparing a mixture, yttrium hydroxide $Y(OH)_3$, gadolinium hydroxide $Gd(OH)_3$, boric acid $H_3BO_3$, and europium hydroxide $Eu(OH)_3$, which are raw materials of the phosphor, are mixed together and dissolved in ion exchange water to have a molar ratio of $(Y(OH)_3+Gd(OH)_3):H_3BO_3:Eu(OH)_3=1-x:1:x$ ($0.05 \leq x \leq 0.20$) (Y:Gd=65:35), thereby preparing a mixture. Next, in the step of preparing a hydrate, an alkaline aqueous solution (for example, ammonia aqueous solution) is added to the mixture, thereby preparing the hydrate.

Then, in a hydrothermal process, the hydrate and the ion-changed water are input to a container made of gold or platinum which has corrosion-resistance and heat-resistance and a hydrothermal synthesis reaction is performed using an device such as an autoclave. The hydrothermal synthesis reaction is performed in the highly pressured container under a condition of a predetermined temperature (for example, 100° C. to 300° C.), a predetermined pressure (for example, 0.2 MPa to 10 MPa), and a predetermined time (for example, 3 to 12 hours). The obtained phosphor has a particle size of 0.1 μm to 2.0 μm and a spherical shape. The phosphor is heat-treated in the air at a temperature of 800° C. to 1,200° C. for 2 hours and sorted, thereby obtaining a red phosphor.

Hereinafter, a synthesis method of $(Y_{1-x})_2O_3:Eu_x$ as a red phosphor will be described.

In a step of preparing a mixture, yttrium nitrate $Y(NO_3)_3$ and europium nitrate $Eu(NO_3)_3$, which are raw materials of the phosphor, are mixed together and dissolved in ion-changed water to have a molar ratio of 2(1-x):x ($0.05 \leq x \leq 0.30$). Next, in a step of preparing a hydrate, an alkaline aqueous solution (for example, ammonia aqueous solution) is added to the mixture, thereby preparing the hydrate.

Then, in a hydrothermal process, the hydrate and the ion-changed water are input to a container made of gold or platinum which has corrosion-resistance and heat-resistance and a hydrothermal synthesis reaction is performed using an device such as an autoclave. The hydrothermal synthesis reaction is performed in the highly pressured container in a temperature of 100° C. to 300° C., at a pressure of 0.2 MPa to 10 MPa, and for 3 to 12 hours. The obtained compound is dried to thus obtain a predetermined $(Y_{1-x})_2O_3$:$Eu_x$.

Next, the phosphor is annealed in the air at a temperature of 800° C. to 1,200° C. for 2 hours and sorted, thereby obtaining a red phosphor. The phosphor obtained from the hydrothermal synthesis process has a particle size of 0.1 μm to 2.0 μm and a spherical shape. Such particle size and shape are suitable for forming a phosphor layer excellent in light emission characteristic.

The phosphor particle described above is manufactured by the hydrothermal synthesis method, the spray synthesis method, and the hydrolysis synthesis method by using a spherical shaped precursor synthesized in an aqueous solution. Therefore, the particle has the spherical shape and small particle size, as described above (a mean particle size is 0.1 μm to 2.0 μm).

As described above, in the phosphor particle manufactured by using spherical shaped precursor rather than the conventional solid-phase reaction, consolidation due to cohesion during the baking process is suppressed, so that a particle size distribution becomes uniformed. Further, nitrate compound and hydrated compound were used as a starting material. However, for example, metal alkoxide $M(O.R)_2$, or acetyl acetone $M(C_5H_7O)_2$ (here, M is metal) may be used, in addition to the compounds described above.

Further, in the above-described red phosphor layer 110R, green phosphor layer 110G, and blue phosphor layer 100B of PDP 100, the phosphor particle manufactured by the hydrothermal synthesis method is used to the whole phosphor layer, but it is also possible to manufacture phosphor layers with same characteristics by the aqueous solution synthesis and the spray synthesis method.

In three colors of R, G, and B, especially, the conventional green phosphor of $Zn_2SiO_4$:Mn structure had a low brightness compared to other phosphor, and the deterioration of the brightness was large. Therefore, in the case in which the three colors were simultaneously emitted, color-temperature of white had a tendency to be decreased. Thus, in the plasma display device, the brightness of the discharge cells, in which phosphor (red and blue) other than green were formed, was lowered using a circuit to improve color temperature of white display. However, when using the green phosphor expressed by $(M_{a-x-y}Eu_xTb_y)O_a \cdot MgO \cdot 2SiO_2$ (M is at least one element selected from Ca, Sr, and Ba) manufactured by the method (method of manufacturing the precursor of the phosphor in the aqueous solution) according to the present invention, the brightness of the green discharge cell is high, and it is not necessary to lower the brightness of the red discharge cell and the blue discharge cell on purpose. Therefore, it is possible to utilize the brightness of the discharge cell of each color to the maximum, so that it is possible to increase the brightness of the plasma display device while the color-temperature of the white display being maintained to be high.

Samples were manufactured based on the above-described embodiment and a performance test experiment was performed for testing the performance of the plasma display device according to the invention.

In each manufactured plasma display device, the size thereof was 42 inches (HD-TV specification in which the distance (W) between barrier ribs 109 was 150 μm), the thickness of dielectric glass layer 105 was 20 μm, the thickness of protective layer 160 was 0.5 μm, the distance between display electrode 103 and display scan electrode 104, which are formed in a pair, was 80 μm. The discharge gas filled into the inside of the discharge spaces was gas composed of Ne (Neon) as a main component and Xe (Xenon) mixed in an amount of 10%, and filled at a discharge gas pressure of 73 kPa.

The phosphor of each color used in the plasma display device according to the embodiment was manufactured by using the precursor in a sphere shape, which was manufactured by the aqueous solution synthesis method, the hydrothermal synthesis method, the spray synthesis method, or the hydrolysis synthesis method. As the green phosphor, $(M_{a-x-y}Eu_xTb_y)O_a \cdot MgO \cdot 2SiO_2$ (M is at least one element selected from Ca, Sr, and Ba, and a is 1, 2, or 3) was used, as the blue phosphor, $Ba_{1-x}MgAl_{10}O_{17}$:$Eu_x$ or $Ba_{1-x-y}Sr_yMgAl_{10}O_{17}$:$Eu_x$ was used, and as the red phosphor, $(Y, Gd)_{1-x}BO_3$:$Eu_x$ or $(Y_{1-x})_2O_3$:$Eu_x$ was used. The phosphor ink used during the time of forming the phosphor layer by using the phosphor of each color was manufactured by mixing a phosphor, a resin, a solvent, and a dispersant in a mixing ratio shown in the present embodiment. When the viscosity (25° C.) of the phosphor ink was measured, it was maintained in a range of 1,500 CP to 30,000 CP in any phosphor. Further, the formed phosphor layer was observed, the phosphor ink was uniformly applied to any one of bamer ribs on the surface thereof, and the film thickness of the phosphor layer was 20 μm.

Further, in the phosphor of each color used in the plasma display device in comparative examples, $(Y_{0.85})_2O_3$:$Eu_{0.15}$ (mean particle size was 2 μm) manufactured by the hydrothermal synthesis method was used as the red phosphor, $Ba_{0.8}MgAl_{10}O_{17}$:$Eu_{0.2}$ (mean particle size was 3 μm) manufactured by the hydrothermal synthesis method was used as the blue phosphor, and $Zn_2SiO_4$:Mn (mean particle size is 3.2 μm) manufactured by a solid-phase reaction method was used as the green phosphor. Then, the phosphor layer (film thickness was 20 μm) was formed by using the phosphor ink at the same condition as that of the plasma display device according to the present embodiment.

Experiment to be described later was performed using the described-above phosphor.

With respect to the samples of the embodiment and the comparative example, rate of change in green phosphor brightness was measured during the panel sealing process (temperature was 450° C.) in the process of manufacturing a panel. Further, rate of change in the brightness during the time of performing an accelerated life test of the panel, existence or nonexistence of address miss during the address discharge, and the brightness of the panel at the time of turning on the whole surface of green were measured.

The rate of change in the brightness of the green phosphor in the panel sealing step was measured as to be described. Specifically, a part of a rear glass substrate before sealing the panel after the phosphor layer was formed was cut out in a predetermined size (for example, about 20 mm×10 mm). Then, the sealing of the panel was performed using the rear glass substrate from which a part was cut out, and a part of the rear glass substrate after sealing the panel was cut out in a predetermined size (for example, about 20 mm×10 mm). And then, the rear glass substrate pieces cut out before and after sealing the panel were set in a vacuum chamber and excimer lamp (vacuum ultraviolet rays was 146 nm) was irradiated thereto, thereby light-emitting the phosphor layer. The light emission was measured by using a luminance meter, and the change of rate (r1) in the brightness was calculated from the brightness of green component before and after sealing the panel by following equation:

$$r1=(BG1-BG0)/BG0\times100$$

Here, BG1 was the brightness of the green component before sealing the panel, and BG1 was the brightness of the green component after sealing the panel.

Further, when the brightness of the panel of the plasma display device was measured, discharge sustain pulse with a voltage of 150 V and a frequency of 30 kHz was applied to the panel to turn on only the green discharge cell. The measurement of the rate of change in the brightness during accelerated life test of the panel was performed such that a discharge sustain pulse with a voltage of 200V and a frequency of 100 kHz was successively applied to the plasma display device for 100 hours, and the brightness of the panel before and after the accelerated life test was measured, and the rate of change (r2) in the brightness was obtained by following equation:

$$r2=(B1-B0)/B0\times100$$

Here, B0 was the brightness before the accelerated life test, and B1 was the brightness after the accelerated life test.

Further, in the present experiment, the discharge was uniformly performed in color phosphor layers, and the brightness-suppression of the discharge cells of red and greens so as to adjust the color-temperature at the time of white display was not performed.

Further, to evaluate the address miss during the time of address discharge, an image is observed and determined whether a flicker exists or not. Even if one flicker existed, it was expressed by 'yes' in following tables.

A composition of the phosphor of each color and a mixing condition, in the case that $(M_{1-x-y}Eu_xTb_y)O\cdot MgO\cdot 2SiO_2$ (here, M is at least one element selected from Ca, Sr, and Ba) was used as the green phosphor, are shown in table 1, and each experiment-measurement result is shown in table 2. Further, a composition of the phosphor of each color and a mixing condition, in the case that $(M_{2-x-y}Eu_xTb_y)O_2\cdot MgO\cdot 2SiO_2$ (here, M is at least one element selected from Ca, Sr, and Ba) was used as the green phosphor, are shown in table 3, and each experimental measurement result is shown in table 4. Further, a composition of the phosphor of each color and a mixing condition, in the case that $(M_{3-x-y}Eu_xTb_y)O_3\cdot MgO\cdot 2SiO_2$ (here, M is at least one element selected from Ca, Sr, and Ba) was used as the green phosphor, are shown in table 5, and each experiment-measurement result is shown in table 6.

Sample No. 30 in tables 1, 3, and 5 represents comparative example, and sample Nos. 1 to 4 in table 1, sample Nos. 11 to 19 in table 3, and sample Nos. 21 to 25 in table 5 represent the present embodiment. An item 'rate of change (r1) in the brightness' indicates the rate of change (r1) in the brightness of the green phosphor during the above-described process of sealing the panel, and an item 'rate of change (r2) in the brightness' indicates the rate of change (r2) in the brightness during the accelerated life test of the panel.

TABLE 1

| | Green phosphor $(M_{1-x-y}Eu_xTb_y)O\cdot MgO\cdot 2SiO_2$ | | | | Red phosphor $(Y,Gd)_{1-x}BO_3:Eu_x$ | | Blue phosphor $Ba_{1-x}MgAl_{10}O_{17}:Eu_x$ | |
|---|---|---|---|---|---|---|---|---|
| Sample No. | x | y | kind of M and ratio of Ca/Sr/Ba | manufacturing method | X | manufacturing method | x | manufacturing method |
| 1 | 0.01 | 0.01 | M = Ca | spray synthesis method | 0.1 | hydrolysis synthesis method | 0.05 | spray synthesis method |
| 2 | 0.02 | 0.1 | M = Ca, Ba Ca/Ba = 0.9/0.1 | hydrolysis synthesis method | 0.2 | spray synthesis method | 0.1 | hydrothermal synthesis method |
| 3 | 0 | 0.05 | M = Ba, Sr Ba/Sr = 0.1/0.9 | aqueous solution synthesis method | 0.3 | Aqueous solution synthesis method | 0.15 | hydrolysis synthesis method |
| 4 | 0.1 | 0.2 | M = Ca, Sr Ca/Sr = 0.5/0.5 | hydrothermal synthesis method | 0.15 | hydrothermal synthesis method | 0.2 | hydrolysis synthesis method |

TABLE 2

| Sample No. | rate of change in brightness r1 (%) | rate of change in brightness r2 (%) | address miss | plugging of nozzle | brightness B (cd/m²) |
|---|---|---|---|---|---|
| 1 | −1.2 | −1.5 | no | no | 305 |
| 2 | −1.0 | −0.5 | no | no | 315 |
| 3 | −1.3 | −0.8 | no | no | 309 |
| 4 | −1.5 | −1.2 | no | no | 330 |
| 30 | −12.7 | −14.1 | yes | yes | 275 |

Sample No. 30 is comparative example

TABLE 3

| Sample No. | x | Y | kind of M and ratio of Ca/Sr/Ba | manufacturing method | X | manufacturing method | x | manufacturing method |
|---|---|---|---|---|---|---|---|---|
| | | | green phosphor $(M_{2-x-y}Eu_xTb_y)O_2 \cdot MgO \cdot 2SiO_2$ | | | red phosphor $(Y, Gd)_{1-x}BO_3 : Eu_x$ | | blue phosphor $Ba_{1-x}MgAl_{10}O_{17} : Eu_x$ |
| 11 | 0.1 | 0 | M = Ca | spray synthesis method | 0.1 | hydrolysis synthesis method | 0.05 | spray synthesis method |
| 12 | 0.02 | 0.01 | M = Ca, Ba Ca/Ba = 0.9/0.1 | hydrolysis synthesis method | 0.2 | spray synthesis method | 0.1 | hydrothermal synthesis method |
| 13 | 0.05 | 0.05 | M = Ba, Sr Ba/Sr = 0.1/0.9 | aqueous solution synthesis method | 0.3 | aqueous solution synthesis method | 0.15 | hydrolysis synthesis method |
| 14 | 0.2 | 0.01 | M = Ca, Sr Ca/Sr = 0.5/0.5 | hydrothermal synthesis method | 0.15 | hydrothermal synthesis method | 0.2 | hydrolysis synthesis method |
| | | | green phosphor $(M_{2-x-y}Eu_xTb_y)O_2 \cdot MgO \cdot 2SiO_2$ | | | red phosphor $(Y_{1-x})_2O_3 : Eu_x$ | | blue phosphor $Ba_{1-x-y}Sr_yMgAl_{10}O_{17} : Eu_x$ |
| 15 | 0.1 | 0.02 | M = Ca, Ba Ca/Ba = 0.5/0.5 | aqueous solution synthesis method | 0.01 | hydrothermal synthesis method | 0.1 | hydrothermal synthesis method |
| 16 | 0.13 | 0.03 | M = Ca, Sr, Ba Ca/Sr/Ba = 0.33/0.33/0.33 | aqueous solution synthesis method | 0.1 | spray synthesis method | 0.15 | spray synthesis method |
| 17 | 0.05 | 0.05 | M = Sr | aqueous solution synthesis method | 0.15 | aqueous solution synthesis method | 0.2 | hydrolysis synthesis method |
| 18 | 0.1 | 0 | M = Ca | aqueous solution synthesis method | 0.2 | hydrolysis synthesis method | 0.2 | hydrolysis synthesis method |
| 19 | 0.08 | 0.02 | M = Ca, Sr Ca/Sr = 0.5/0.5 | aqueous solution synthesis method | 0.2 | hydrolysis synthesis method | 0.2 | hydrolysis synthesis method |

TABLE 4

| Sample No. | rate of change in brightness r1 (%) | rate of change in brightness r2 (%) | address miss | plugging of nozzle | brightness B (cd/m$^2$) |
|---|---|---|---|---|---|
| 11 | −0.8 | −1.0 | no | no | 305 |
| 12 | −1.0 | −1.3 | no | no | 315 |
| 13 | −0.9 | −1.2 | no | no | 309 |
| 14 | −0.5 | −0.8 | no | no | 330 |
| 15 | −0.6 | −0.9 | no | no | 318 |
| 16 | −0.5 | −0.7 | no | no | 320 |
| 17 | −0.8 | −1.0 | no | no | 317 |
| 18 | −0.7 | −0.9 | no | no | 310 |
| 19 | −0.9 | −1.1 | no | no | 320 |
| 30 | −12.7 | −14.1 | yes | yes | 275 |

Sample No. 30 is comparative example

TABLE 5

| Sample No. | x | y | kind of M and ratio of Ca/Sr/Ba | manufacturing method | X | manufacturing method | x | manufacturing method |
|---|---|---|---|---|---|---|---|---|
| | | | green phosphor $(M_{3-x-y}Eu_xTb_y)O_3 \cdot MgO \cdot 2SiO_2$ | | | red phosphor $(Y_{1-x})_2O_3 : Eu_x$ | | blue phosphor $Ba_{1-x-y}Sr_yMgAl_{10}O_{17} : Eu_x$ |
| 21 | 0.08 | 0.1 | M = Ca, Ba Ca/Ba = 0.5/0.5 | aqueous solution synthesis method | 0.01 | hydrothermal synthesis method | 0.1 | hydrothermal synthesis method |

TABLE 5-continued

| | green phosphor $(M_{3-x-y}Eu_xTb_y)O_3 \cdot MgO \cdot 2SiO_2$ | | | red phosphor $(Y_{1-x})_2O_3:Eu_x$ | | blue phosphor $Ba_{1-x-y}Sr_yMgAl_{10}O_{17}:Eu_x$ | |
|---|---|---|---|---|---|---|---|
| Sample No. | x | y | kind of M and ratio of Ca/Sr/Ba | manufacturing method | X | manufacturing method | x | manufacturing method |
| 22 | 0 | 0.01 | M = Ca, Sr, Ba  Ca/Sr/Ba = 0.33/0.33/0.33 | aqueous solution synthesis method | 0.1 | spray synthesis method | 0.15 | spray synthesis method |
| 23 | 0.05 | 0.2 | M = Sr | aqueous solution synthesis method | 0.15 | aqueous solution synthesis method | 0.2 | hydrolysis synthesis method |
| 24 | 0.1 | 0.1 | M = Ca | aqueous solution synthesis method | 0.2 | hydrolysis synthesis method | 0.2 | hydrolysis synthesis method |
| 25 | 0.02 | 0.1 | M = Ca, Sr  Ca/Sr = 0.5/0.5 | aqueous solution synthesis method | 0.2 | hydrolysis synthesis method | 0.2 | hydrolysis synthesis method |

TABLE 6

| Sample No. | rate of change in brightness r1 (%) | rate of change in brightness r2 (%) | address miss | plugging of nozzle | brightness B (cd/m²) |
|---|---|---|---|---|---|
| 21 | −1.2 | −0.9 | no | no | 318 |
| 22 | −1.2 | −1.5 | no | no | 320 |
| 23 | −1.5 | −0.8 | no | no | 317 |
| 24 | −1.8 | −1.5 | no | no | 310 |
| 25 | −1.1 | −1.1 | no | no | 320 |
| 30 | −12.7 | −14.1 | yes | yes | 275 |

Sample No. 30 is comparative example

As shown in tables 2, 4, and 6, in the comparative sample 10, the rate of change (r1) in brightness during the process of sealing the panel was −12.7%, and the rate of change (r2) in brightness during the accelerated life test was −14.1%. Further, the address miss during the address discharge existed, and the brightness B of the panel in the case of green-colored whole surface being turned on was 275 cd/m². Further, during the period when ink applying device for applying the phosphor ink was used for 200 hours, the plugging of the nozzle was generated.

On the other hand, in samples 1 to 4 in the case in which $(M_{1-x-y}Eu_xTb_y)O \cdot MgO \cdot 2SiO_2$ was used as the green phosphor, as shown in table 2, the brightness B of the panel in the case of green-colored whole surface being turned on exceeded 300 cd/m² in all samples. Further, the rate of change (r1) in brightness during the process of sealing the panel was from −1.0% to −1.5%, and the rate of change (r2) in brightness during ccelerated life test was from −0.5% to −1.5%. Further, the address miss during the address discharge did not exist. Further, during the period when ink applying device for applying the phosphor ink was used for 200 hours, the plugging of the nozzle was not generated.

Further, in samples 11 to 19 in the case in which $(M_{2-x-y}Eu_xTb_y)O_2 \cdot MgO \cdot 2SiO_2$ was used as the green phosphor, as shown in table 4, the brightness B of the panel in the case of green-colored whole surface being turned on exceeded 300 cd/m² in all samples. Further, the rate of change (r1) in brightness during the process of sealing the panel was from −0.5% to −1.0%, and the rate of change (r2) in brightness during the accelerated life test was from −0.7% to −1.3%. Further, the address miss during the address discharge did not exist. Further, during the period when ink applying device 200 for applying the phosphor ink was used for 200 hours, the plugging of the nozzle was not generated.

Further, in samples 21 to 25 in the case in which $(M_{3-x-y}Eu_xTb_y)O_3 \cdot MgO \cdot 2SiO_2$ (here, M is at least one element selected from Ca, Sr, and Ba) was used as the green phosphor, as shown in table 6, the brightness B of the panel in the case of green-colored whole surface being turned on exceeded 300 cd/m² in all samples. Further, the rate of change (r1) in brightness during the process of sealing the panel was from −1.1% to −1.8%, and the rate of change (r2) in brightness during the accelerated life test was from −0.8% to −1.5%. Further, the address miss during the address discharge did not exist. Further, during the period when ink applying device for applying the phosphor ink was used for 200 hours, the plugging of the nozzle was not generated.

That is, samples (sample Nos. 1 to 4, 11 to 19, and 21 to 25) according to the present embodiment showed excellent characteristics in the brightness of the panel in the case of green-colored whole surface being turned on, the rate of change in brightness during the process of sealing the panel, the rate of change in brightness during the accelerated life test, the address miss during the address discharge, and the plugging of the nozzle of the ink applying device compared to the comparative example (Sample No. 30).

That is, the green phosphor according to the invention has a structure of $(M_{a-x-y}Eu_xTb_y)O_a \cdot MgO \cdot 2SiO_2$ (here, M is at least one element selected from Ca, Sr, and Ba) manufactured by the aqueous solution synthesis method, the hydrothermal synthesis method, the spray synthesis method, and the hydrolysis synthesis method, and the relatively small-sized phosphor particle (mean particle size is 0.1 μm to 3.0 μm) having a substantially spherical shape is synthesized, so that the grinding of the particle is not necessary. Further, the deterioration of the brightness due to the oxygen defect, which is generated when ZnO is selectively scattered (sublimated) like the conventional $Zn_2SiO_4$:Mn, is not generated. Therefore, in the phosphor according to the present embodiment, the oxygen defect is suppressed, so that the deterioration of the crystalline property started by the oxygen defect does not readily proceed. Especially, since the brightness of green is suppressed, and the amount of ultraviolet rays absorbed by the oxygen defect becomes small, the excitation of the light-emission center is easily performed, thereby the brightness is improved compared to the conventional plasma display device.

INDUSTRIAL APPLICABILITY

According to the plasma display device and the manufacturing method thereof of the invention, it is possible to provide a plasma display device including a green phosphor of which brightness is hardly deteriorated, and it is useful to enhance the brightness, the lifetime, and the reliability of the plasma display device as a large-sized image display device.

The invention claimed is:

1. A plasma display device comprising:
  a plasma display panel comprising a plurality of discharge cells of at least one color, a plurality of phosphor layers within the discharge cells for emitting light when excited by ultraviolet rays,
  wherein the phosphor layers include green phosphor layers, and
  the green phosphor layers include a green phosphor having the formula $(M_{a-x-y}Eu_xTb_y)O_a \cdot MgO \cdot 2SiO_2$, wherein a is 1, 2, or 3, $0 \leq x \leq 0.2$, $0 \leq y \leq 0.2$ and M is at least one element selected from the group consisting of Ca, Sr, and Ba.

2. A plasma display device comprising:
  a plasma display panel comprising a plurality of discharge cells of at least one color, a plurality of phosphor layers within the discharge cells for emitting light when excited by ultraviolet rays,
  wherein the phosphor layers include green phosphor layers, and
  the green phosphor layers include a green phosphor having the formula $(M_{a-x-y}Eu_xTb_y)O_a \cdot MgO \cdot 2SiO_2$, wherein a=1, $0 \leq x \leq 0.1$, and $0.01 \leq y \leq 0.2$ and M is at least one element selected from the group consisting of Ca, Sr, and Ba.

3. The plasma display device according to claim 1, wherein a=2, $0.02 \leq x \leq 0.2$, and $0 \leq y \leq 0.05$.

4. The plasma display device according to claim 1, wherein a=3, $0 \leq x \leq 0.1$, and $0.01 \leq y \leq 0.2$.

5. The plasma display device according to claim 1, wherein the mean particle size of the green phosphor is 0.1 μm to 3.0 μm.

6. A method of manufacturing the plasma display device of claim 1 comprising:
  forming the green phosphor layers including the green phosphor
  wherein the green phosphor is made by any one of an aqueous solution synthesis method, a spray synthesis method, a hydrothermal synthesis method, and a hydrolysis synthesis method.

7. The method of manufacturing a plasma display device according to claim 6, wherein the green phosphor is made by the aqueous solution synthesis method, comprising:
  preparing a mixture by mixing a raw material of the phosphor and an aqueous medium,
  preparing a hydrate by mixing the mixture and an alkaline aqueous solution,
  thermally treating the solution containing the hydrate at a temperature of 700° C. to 900° C. in the air to obtain a precursor powder of the phosphor, and
  baking the precursor powder of the phosphor at a temperature between 1000° C. and 1400° C. under a reducing atmosphere.

8. The method of manufacturing a plasma display device according to claim 6, wherein the green phosphor is made by the hydrothermal synthesis methods, comprising:
  preparing a mixture by mixing a raw material of the phosphor and an aqueous medium,
  preparing a hydrate by mixing the mixture and an alkaline aqueous solution,
  hydrothermally synthesizing a solution containing the hydrate at a temperature of 100° C. to 300° C. and at a state in which a pressure is 0.2 MPa to 10 Mpa to obtain a precursor powder of the phosphor, and
  baking the precursor powder of the phosphor at a temperature between 800° C. and 1400° C., under a reducing atmosphere.

9. The method of manufacturing a plasma display device according to claim 6, wherein the green phosphor is made by the spray synthesis method, comprising:
  preparing a mixture by mixing a raw material of the phosphor and an aqueous medium,
  preparing a hydrate by mixing the mixture and an alkaline aqueous solution,
  spraying the solution containing the hydrate into a furnace heated to a temperature of 1000° C. to 1500° C. to obtain a precursor powder of the phosphor, and
  baking the precursor powder of the phosphor at a temperature between 800° C. and 1400° C., under a reducing atmosphere.

* * * * *